US012131684B2

(12) United States Patent
Kang

(10) Patent No.: US 12,131,684 B2
(45) Date of Patent: Oct. 29, 2024

(54) CLOCK GENERATOR AND DISPLAY DEVICE INCLUDING THE SAME

(71) Applicant: LG Display Co., Ltd., Seoul (KR)

(72) Inventor: Yeon Wook Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/208,205

(22) Filed: Jun. 9, 2023

(65) Prior Publication Data

US 2024/0071282 A1 Feb. 29, 2024

(30) Foreign Application Priority Data

Aug. 31, 2022 (KR) ........................ 10-2022-0110036

(51) Int. Cl.
*G09G 3/20* (2006.01)

(52) U.S. Cl.
CPC ... *G09G 3/2092* (2013.01); *G09G 2310/0267* (2013.01); *G09G 2310/08* (2013.01); *G09G 2330/06* (2013.01)

(58) Field of Classification Search
CPC ......... G09G 3/2092; G09G 2310/0267; G09G 2310/08; G09G 2330/06; G09G 5/003; G09G 5/18; G09G 5/008; G09G 2370/08; G09G 3/32; G09G 2300/0426; H03K 5/1252
See application file for complete search history.

(56) References Cited

U.S. PATENT DOCUMENTS

2001/0015712 A1* 8/2001 Hashimoto .......... G09G 3/3688 345/92
2007/0070005 A1* 3/2007 Okamura ............... G09G 5/363 345/88
2007/0132701 A1* 6/2007 Jeon ..................... G09G 3/3611 345/100
2007/0164883 A1* 7/2007 Furtner ............... H04L 25/4908 341/126
2008/0218232 A1* 9/2008 Jeon ......................... G09G 3/20 327/165
2008/0246755 A1* 10/2008 Lee .......................... G09G 3/20 345/214
2009/0115477 A1* 5/2009 Lin .......................... G09G 3/20 327/161
2009/0174691 A1* 7/2009 Yeo ........................ G09G 5/008 345/204
2010/0039426 A1* 2/2010 Matsumoto .... H03K 19/018528 345/98
2010/0045588 A1* 2/2010 Lee ...................... G09G 3/3688 345/99
2010/0085084 A1* 4/2010 Kim ..................... G09G 3/3648 327/108

(Continued)

*Primary Examiner* — Jose R Soto Lopez
(74) *Attorney, Agent, or Firm* — Fenwick & West LLP

(57) ABSTRACT

Disclosed is a clock generator including an oscillator configured to output a reference clock signal to a first line, an EMI reduction controller configured to generate an EMI reduction signal offset with the reference clock signal and to output the EMI reduction signal to a second line, and a driving clock generator configured to generate an operation clock based on the reference clock signal, which is one of the reference clock signal input through the first line and the EMI reduction signal input through the second line.

18 Claims, 13 Drawing Sheets

(56) References Cited

U.S. PATENT DOCUMENTS

| | | | | |
|---|---|---|---|---|
| 2010/0128064 | A1* | 5/2010 | Taylor | G09G 3/3413 345/83 |
| 2010/0177085 | A1* | 7/2010 | Yamagishi | G09G 3/36 345/87 |
| 2010/0231787 | A1* | 9/2010 | Kim | G09G 3/3688 348/503 |
| 2010/0315552 | A1* | 12/2010 | Rothaar | H03L 7/093 359/199.1 |
| 2011/0032421 | A1* | 2/2011 | Kota | G09G 5/18 348/E5.009 |
| 2011/0080382 | A1* | 4/2011 | Koo | G09G 3/20 327/108 |
| 2011/0157104 | A1* | 6/2011 | Kang | G09G 3/3611 345/204 |
| 2011/0286562 | A1* | 11/2011 | Jeon | H03L 7/0816 375/371 |
| 2011/0292028 | A1* | 12/2011 | Seo | G09G 3/2096 345/213 |
| 2016/0241251 | A1* | 8/2016 | Kim | H03L 7/0995 |
| 2016/0260411 | A1* | 9/2016 | Han | G09G 5/008 |
| 2016/0284313 | A1* | 9/2016 | Lin | G09G 5/18 |
| 2017/0206848 | A1* | 7/2017 | Jeon | G09G 3/2007 |
| 2017/0309242 | A1* | 10/2017 | Kim | H01L 29/78633 |
| 2018/0040267 | A1* | 2/2018 | Huang | G09G 3/006 |
| 2018/0096656 | A1* | 4/2018 | Lee | G09G 3/3266 |
| 2018/0190238 | A1* | 7/2018 | Park | G09G 5/008 |
| 2018/0357946 | A1* | 12/2018 | Ryu | G09G 3/2092 |
| 2019/0155432 | A1* | 5/2019 | Park | G06F 3/0412 |
| 2019/0156761 | A1* | 5/2019 | Kim | G09G 3/3677 |
| 2020/0029059 | A1* | 1/2020 | Chahine | H04N 23/23 |
| 2021/0020134 | A1* | 1/2021 | Park | G09G 3/3677 |
| 2021/0125572 | A1* | 4/2021 | Zhang | G09G 3/3696 |
| 2022/0139325 | A1* | 5/2022 | Lee | G09G 3/3266 345/694 |
| 2022/0208145 | A1* | 6/2022 | Glen | G06F 3/1446 |
| 2023/0018128 | A1* | 1/2023 | Byeon | G09G 5/18 |
| 2023/0040625 | A1* | 2/2023 | Park | G09G 3/3291 |

* cited by examiner

CLOCK GENERATOR AND DISPLAY DEVICE INCLUDING THE SAME

CROSS-REFERENCE TO RELATED APPLICATION

This application claims the benefit of Republic of Korea Patent Application No. 10-2022-0110036, filed on Aug. 31, 2022, which is hereby incorporated by reference in its entirety.

BACKGROUND

Field of Technology

The present disclosure relates to a clock generator and a display device including the same.

Discussion of the Related Art

With improvement in performance of display devices, the amount of data to be processed has increased. Display devices may be operated at a high speed to process a large amount of data, thereby providing high-resolution, high-quality images.

In order to process data at a high speed, a high-frequency clock signal must be generated, and designated operations must be performed based on the generated clock signal. However, the high-frequency clock signal, which is regularly generated, induces electromagnetic interference (hereinafter referred to as EMI). EMI may induce malfunction of peripheral circuits and devices, and therefore there is a need for a method capable of reducing EMI from a display device.

SUMMARY

Accordingly, the present disclosure is directed to a clock generator and a display device including the same that substantially obviate one or more problems due to limitations and disadvantages of the related art.

It is an object of the present disclosure to provide a clock generator capable of reducing the effect of EMI due to a high-frequency clock signal and a display device including the same.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a clock generator includes an oscillator configured to output a reference clock signal to a first line, an EMI reduction controller configured to generate an EMI reduction signal offset with the reference clock signal and to output the EMI reduction signal to a second line, and a driving clock generator configured to generate an operation clock based on the reference clock signal, which is one of the reference clock signal input through the first line and the EMI reduction signal input through the second line.

The clock generator may further include a delay compensator configured to synchronize phases of the reference clock signal and the EMI reduction signal.

The driving clock generator may include a plurality of multiplexers connected to the first line and the second line in a tree structure, the plurality of multiplexers being configured to output the reference clock applied to the first line, and a plurality of flip-flops respectively connected to the plurality of multiplexers, the plurality of flip-flops being configured to generate a driving clock based on the reference clock.

The EMI reduction signal may include an inverted OSC signal for offsetting EMI by the reference clock signal and a ground signal for shielding the reference clock signal.

The EMI reduction controller may include an inverter configured to invert the reference clock signal in order to generate the inverted OSC signal and an output circuit configured to output a selected one of the inverted OSC signal and the ground signal.

The first line and the second line may be disposed so as to have a uniform distance therebetween.

The first line may include a plurality of first protrusions protruding to an area adjacent to the second line, the second line may include a plurality of second protrusions protruding to an area adjacent to the first line, the second protrusions having the same shape as the first protrusions, and the first protrusions and the second protrusions may be alternately arranged.

The first protrusions and the second protrusions may be arranged such that the distance between an end of each of the first protrusions and an end of a corresponding one of the second protrusions is equal to or greater than the vertical distance between the end of the first protrusion and the second line.

Each of the first protrusions and the second protrusions may be formed so as to have a loop shape.

In another aspect of the present disclosure, a display device includes a display panel including a plurality of pixels connected to a data line and a gate line, a gate driver IC configured to supply a gate signal to the gate line, and a plurality of timing controller merged ICs (TMICs) configured to covert an image signal input from the outside and to supply image data to the display panel, wherein each of the plurality of TMICs includes an oscillator configured to output a reference clock signal to a first line, an EMI reduction controller configured to generate an EMI reduction signal offset with the reference clock signal and to output the EMI reduction signal to a second line, and a driving clock generator configured to generate an operation clock for supplying the image data to the display panel based on the reference clock signal, which is one of the reference clock signal input through the first line and the EMI reduction signal input through the second line.

Each of the plurality of TMICs may further include a cascade synchronization controller configured to synchronize the operation clock.

One of the plurality of TMICs may be set as a master TMIC, and the master TMIC may generate a control signal for controlling the gate driver IC based on the reference clock signal and may apply the control signal to the gate driver IC.

Each of the plurality of TMICs may further include a delay compensator configured to synchronize phases of the reference clock signal and the EMI reduction signal.

The EMI reduction signal may include an inverted OSC signal for offsetting EMI by the reference clock signal and a ground signal for shielding the reference clock signal.

The first line and the second line may be disposed so as to have a uniform distance therebetween, the first line may include a plurality of first protrusions protruding to an area adjacent to the second line, the second line may include a plurality of second protrusions protruding to an area adjacent to the first line, the second protrusions having the same shape as the first protrusions, and the first protrusions and the second protrusions may be alternately arranged.

The first protrusions and the second protrusions may be arranged such that the distance between an end of each of the first protrusions and an end of a corresponding one of the second protrusions is equal to or greater than the vertical distance between the end of the first protrusion and the second line.

Each of the first protrusions and the second protrusions may be formed so as to have a loop shape.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
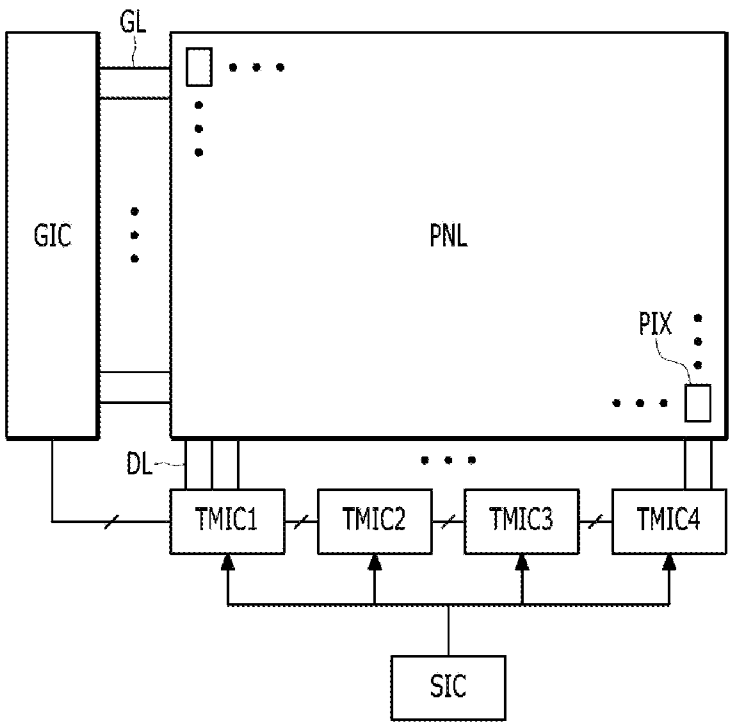
FIG. 1 is a view showing a display device according to an embodiment of the present disclosure.

Advantages and features of the present disclosure and methods of achieving the same will be more clearly understood from embodiments described below with reference to the accompanying drawings. However, the present disclosure is not limited to the following embodiments and may be implemented in various different forms. The embodiments are provided merely to complete the present disclosure and to fully inform a person having ordinary skill in the art to which the present disclosure pertains of the category of the present disclosure. The present disclosure is defined only by the category of the claims.

In the drawings for explaining the exemplary embodiments of the present disclosure, for example, the illustrated shape, size, ratio, angle, and number are given by way of example, and thus, are not limitative of the present disclosure. Throughout the present specification, the same reference numerals designate the same constituent elements. The terms "comprises", "includes", and "has", used in this specification, do not preclude the presence or addition of other elements unless used along with the term "only". The singular forms are intended to include the plural forms as well, unless the context clearly indicates otherwise.

In the interpretation of constituent elements, the constituent elements are interpreted as including an error range even if there is no explicit description thereof.

When describing positional relationships, for example, when the positional relationship between two parts is described using "on", "above", "below", "beside", or the like, one or more other parts may be located between the two parts unless the term "directly" or "closely" is used therewith.

Although the terms "first", "second", etc. may be used to describe various elements, the elements are not limited by the terms. These terms are merely used to distinguish one element from another element. Therefore, a "first element" described hereinafter may be a "second element" within the technical idea of the present disclosure.

Throughout the present specification, the same reference numerals substantially designate the same constituent elements. Hereinafter, embodiments of the present disclosure will be described in detail with reference to the accompanying drawings. In the following description of the present disclosure, a detailed description of known functions and configurations incorporated herein will be omitted when it may make the subject matter of the present disclosure rather unclear.

FIG. 1 is a view showing a display device according to an embodiment of the present disclosure.

Referring to FIG. 1, the display device according to the embodiment of the present disclosure may be implemented by an electroluminescent display device or a liquid crystal display device including a display panel PNL configured to display an image, data driver ICs TMIC1 to TMIC4, a gate driver IC GIC, and a system IC SIC.

The display panel PNL may be provided with a plurality of data lines DL and a plurality of gate lines GL, pixels PIX may be disposed at intersections between the signal lines GL and DL in a matrix form. Pixels PIX constituting the same horizontal line are connected to the same gate line GL, and pixels PIX constituting the same vertical line are connected to the same data line DL. Each of the pixels PIX may be implemented by a light emitting cell including a light emitting diode or a liquid crystal cell including a liquid crystal layer in order to display an image.

The system IC SIC may provide an image signal input from the outside and control signals, such as a vertical synchronization signal Vsync and a horizontal synchronization signal Hsync, to the data driver ICs TMIC1 to TMIC4.

Each of the data driver ICs TMIC1 to TMIC4 is implemented by a timing controller merged driver IC that performs both the function of a timing controller and the function of a data driver. Consequently, the data driver ICs TMIC1 to TMIC4 may generate a data control signal DCS for controlling the supply of an analog image signal to the display panel PNL based on the control signals provided from the system IC SIC, such as the vertical synchronization signal Vsync and the horizontal synchronization signal Hsync, and a gate control signal GCS for controlling the gate driver IC GIC. Here, the data control signal DCS may include source start pulse SSP, source sampling clock SSC, and source output enable SOE. The gate control signal GCS may include gate start pulse GSP, gate shift clock GSC, and gate output enable GOE. The data driver ICs TMIC1 to TMIC4 convert image data provided from the system IC SIC into data voltage, which is an analog signal, and supply the same to the data lines DL based on the generated data control signal.

Each of the data driver ICs TMIC1 to TMIC4 includes an oscillator independently mounted therein in order to generate various control signals. Each of the data driver ICs TMIC1 to TMIC4 includes a clock generator configured to generate various necessary control signals using an oscillation signal generated by the oscillator mounted therein. At this time, in order to synchronize operations between the data driver ICs TMIC1 to TMIC4, one of the data driver ICs is set to a master, and the others are set as slaves. The master data driver IC may perform control such that the slave data driver ICs are synchronized and may apply the gate control signal to the gate driver IC GIC in order to control the operation of the gate driver IC GIC.

The gate driver IC GIC generates a gate driving signal based on the gate control signal. The gate driver IC GIC sequentially supplies the gate driving signal to the gate lines GL such that one gate line GL is driven every horizontal period. A horizontal line to which data voltage is to be written is selected by the gate driving signal, and pixels of one horizontal line connected to a corresponding gate line GL are enabled. As previously described, the master data driver IC may control the operation of the gate driver IC GIC.

Figure 2:
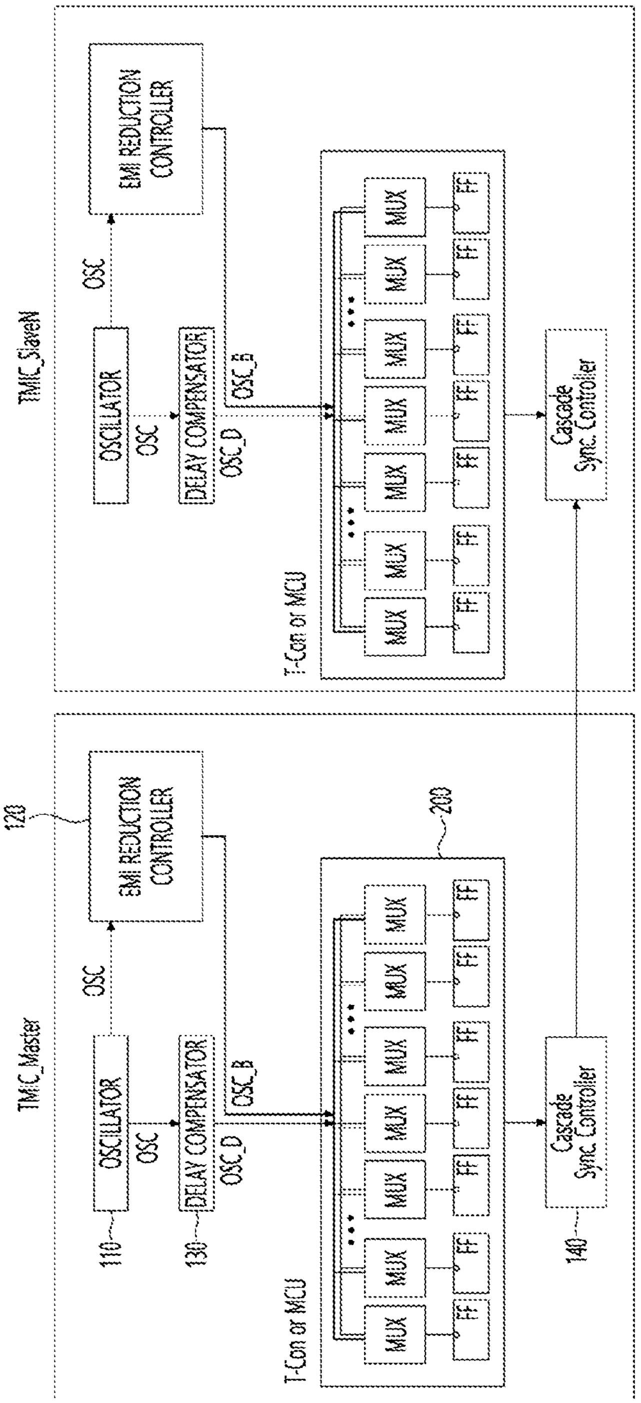
FIG. 2 is a view showing the construction of data driver ICs TMICs of FIG. 1 according to an embodiment of the present disclosure.

FIG. 2 is a view showing the clock generator of each of the data driver ICs TMICs of FIG. 1 according to one embodiment. The display device includes a plurality of data driver ICs TMICs, and one of the data driver ICs is set as a master while the others are set as slaves in order to synchronize operations between the data driver ICs TMIC1 to TMIC4. The plurality of data driver ICs TMIC1 to TMIC4 may be connected to each other in a cascade manner in which units are sequentially operated. Consequently, the first data driver IC TMIC1 may be set as a master. The clock generators included in the data driver ICs TMIC1 to TMIC4 are identical in construction to each other, and therefore the construction of the master data driver IC TMIC_Master will be representatively described.

Referring to FIG. 2, the master data driver IC TMIC_Master includes an oscillator 110, a delay compensator 130 (e.g., a circuit), an EMI reduction controller 120 (e.g., a circuit), a driving clock generator 200 (e.g., a circuit), and a cascade synchronization controller 140 (e.g., a circuit).

The oscillator 110 outputs an oscillation clock signal OSC having a fixed frequency. The OSC signal is output as a high-frequency signal having a frequency of several tens of MHz and is used as a reference clock when timing for driving the display device is generated. The OSC signal is input to each of the EMI reduction controller 120 and the delay compensator 130.

The EMI reduction controller 120 outputs an EMI reduction signal capable of reducing EMI of the OSC signal. The EMI reduction signal may include an inverted OSC signal, which is an inverted signal of the OSC signal, and a ground signal. The EMI reduction controller 120 selectively supplies the inverted OSC signal or the ground signal depending on predetermined setting information.

The delay compensator 130 compensates for the delay in phase of the OSC signal such that the inverted OSC signal output from the EMI reduction controller 120 and the OSC signal output from the oscillator 110 are offset from each other. The delay compensator 130 may synchronize the point in time at which the OSC signal rises and the point in time at which the inverted OSC signal falls or the point in time at which the OSC signal falls and the point in time at which the inverted OSC signal rises in order to maximize the offset effect between the two signals, thereby maximizing the EMI reduction effect.

The driving clock generator 200 may generate operation timing for driving the data driver IC TMIC, such as the function of the timing controller and the function of the data driver. The driving clock generator 200 generates operation timing using the OSC signal as a reference signal. In order to generate operation timing, the driving clock generator 200 includes a plurality of flip-flops FF and a plurality of multiplexers MUX corresponding to the flip-flops FF. The OSC signal and the EMI reduction signal are input to the multiplexers MUX corresponding to the flip-flops FF in a clock tree structure. Each of the multiplexers MUX is operated such that the OSC signal, which is one of the EMI OSC signal and the EMI reduction signal, to a corresponding one of the flip-flops FF. Consequently, each of the multiplexers MUX may be implemented by a 2-to-1 multiplexer MUX configured to receive two signals and to output one signal. The driving clock generator 200 may generate operation timing based on the OSC signal selectively input by the multiplexer MUX.

The cascade synchronization controller 140 provides clock of the master data driver IC TMIC_Master to the slave data driver ICs TMIC_SlaveN to synchronize operation timings of the data driver ICs TMIC1 to TMIC4.

Figure 3:
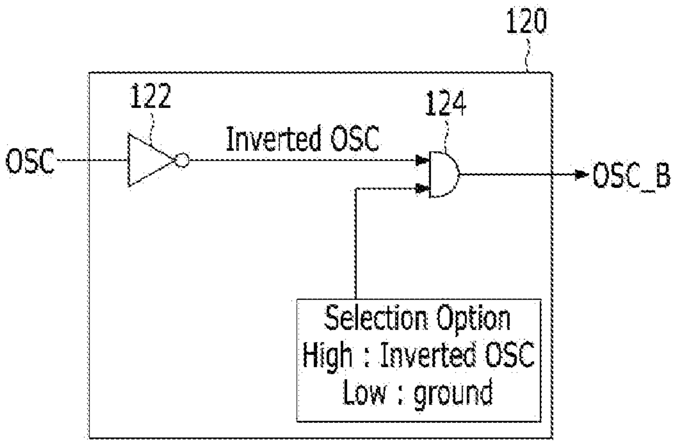
FIGS. 3 and 4 are views showing the construction of an EMI reduction controller of FIG. 2 and an input and output signal relationship according to an embodiment of the present disclosure.
Figure 4:
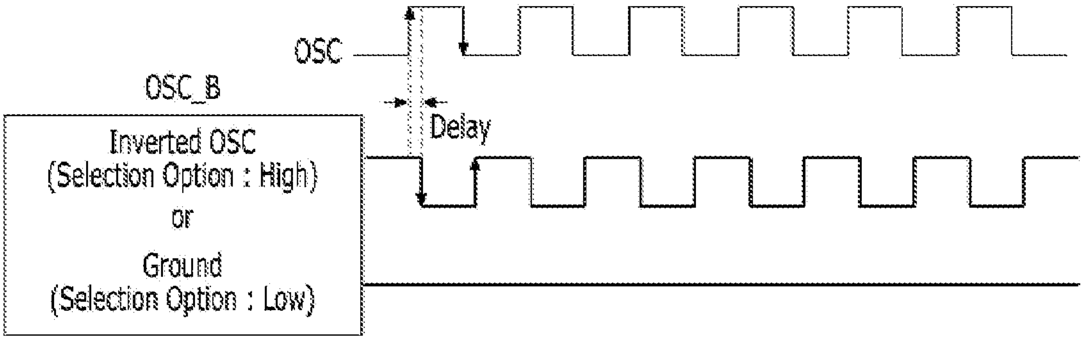

FIGS. 3 and 4 are views showing the construction of the EMI reduction controller 120 of FIG. 2 and an input and output signal relationship according to one embodiment. The EMI reduction controller 120 may an inverted OSC signal or a ground signal as an EMI reduction signal according to predetermined setting.

Referring to FIGS. 3 and 4, the EMI reduction controller 120 may include an inverter 122 and an AND circuit 124.

The inverter 122 receives the OSC signal output from the oscillator 110 and outputs an inverted OSC signal, which is an inverted signal of the OSC signal.

The AND circuit 124 receives the inverted OSC signal and a selection signal and outputs the AND operation result OSC_B of the two signals. A high signal or a low signal is input as the selection signal. AND operation is a logical operation that outputs the conjunction of two inputs. When two inputs are high, therefore, a high signal is output. When the selection signal is input to the AND circuit 124 as a low signal, therefore, a low signal, i.e., a ground signal, is output as the AND operation result OSC_B. When the selection signal is output as a high signal, the same signal as the high/low state of the inverted OSC signal is output as the AND operation result OSC_B, and therefore the same signal as the inverted OSC signal is output. Here, the inverted OSC signal output as the AND operation result OSC_B is a signal obtained as the result of the OSC signal output from the oscillator 110 being output through the inverter 122 and the AND circuit 124. Consequently, the output signal OSC_B of the EMI reduction controller 120 has predetermined time delay from the OSC signal output from the oscillator 110.

Figure 5:
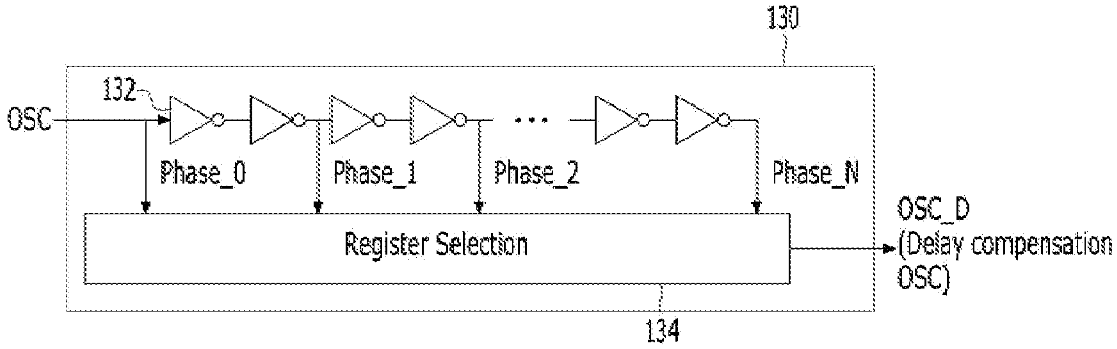
FIGS. 5 and 6 are views showing the construction of a delay compensator of FIG. 2 and an input and output signal relationship according to an embodiment of the present disclosure.
Figure 6:
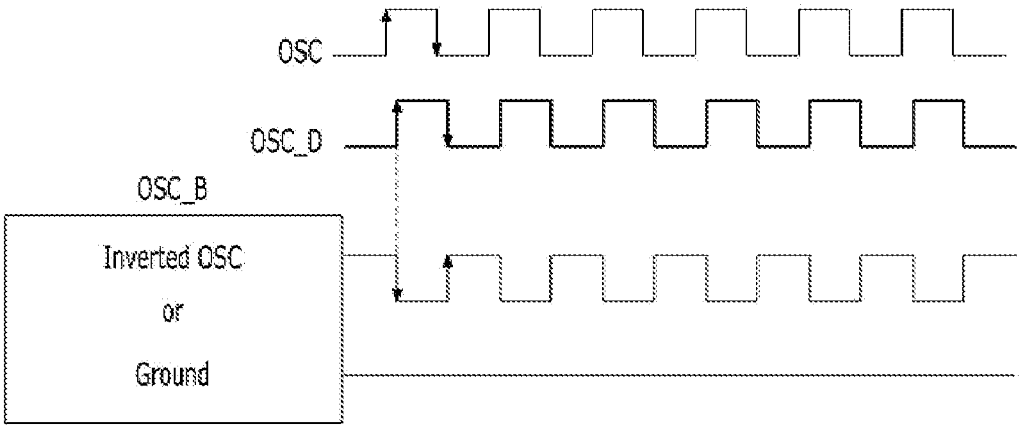

FIGS. 5 and 6 are views showing the construction of the delay compensator 130 of FIG. 2 and an input and output signal relationship according to one embodiment. The delay compensator 130 compensates the delay in phase of the OSC signal such that the OSC signal output from the oscillator 110 is offset based on the delay of the EMI reduction signal OSC_B output from the EMI reduction controller 120.

Referring to FIGS. 5 and 6, the delay compensator 130 includes a plurality of inverters 132 and a register selector 134 configured to store OSC signals delayed through the inverters 132 as signals Phase_0 to Phase_N and to output a delay-compensated OSC signal OSC_D, which is an OSC signal selected for delay compensation.

The plurality of inverters 132 generate delayed OSC signals by receiving the OSC signal output from the oscillator 110, inverting the OSC signal, and re-inverting the inverted OSC signal. Before input to the inverter, the OSC signal is not delayed. However, OSC signals output through the first and second inverters and OSC signals output through the third and fourth inverters are output in the state in which the phases of the signals are delayed although the signals have the same size.

The register selector 134 stores OSC delay signals output from the plurality of inverters 132, selects a delay signal synchronized in phase with the EMI reduction signal OSC_B output from the EMI reduction controller 120, and outputs a delay-compensated OSC signal OSC_D. The register selector 134 may store an OSC signal before input to the inverter as a Phase_0 signal, which is a signal before delay, and an OSC signal delayed once as the result of passing through the first and second inverters as a Phase_1 signal. The Phase_1 signal may be stored as a Phase_2 signal, which is a signal delayed twice, as the result of passing through the third and fourth inverters. In this way, OSC signals delayed up to Phase_N may be stored. Subsequently, EMI evaluation may be performed using the delay signals from Phase_0 to Phase_N to confirm the optimum delay signal, i.e., the delay signal synchronized in phase with the EMI reduction signal OSC_B, and the register selector 134 may output the delay signal of the corresponding phase as a delay-compensated OSC signal OSC_D.

When the EMI reduction signal OSC_B is an inverted OSC signal, the point in time at which the delay-compensated OSC signal OSC_D rises may be synchronized with the point in time at which the inverted OSC signal falls, and the point in time at which the delay-compensated OSC signal OSC_D falls may be synchronized with the point in time at which the inverted OSC signal rises. Consequently, EMI due to the OSC signal OSC_D may be offset by the EMI reduction signal OSC_B.

The EMI reduction signal OSC_B output from the EMI reduction controller 120 and the delay-compensated OSC signal OSC_D are supplied to the signal lines disposed parallel to each other and are input to the plurality of multiplexers MUX of the driving clock generator 200 in a clock tree structure. The plurality of multiplexers MUX inputs the delay-compensated OSC signal OSC_D, which is one of the EMI reduction signal OSC_B and the delay-compensated OSC signal OSC_D, to the flip-flops FF.

Figure 7:
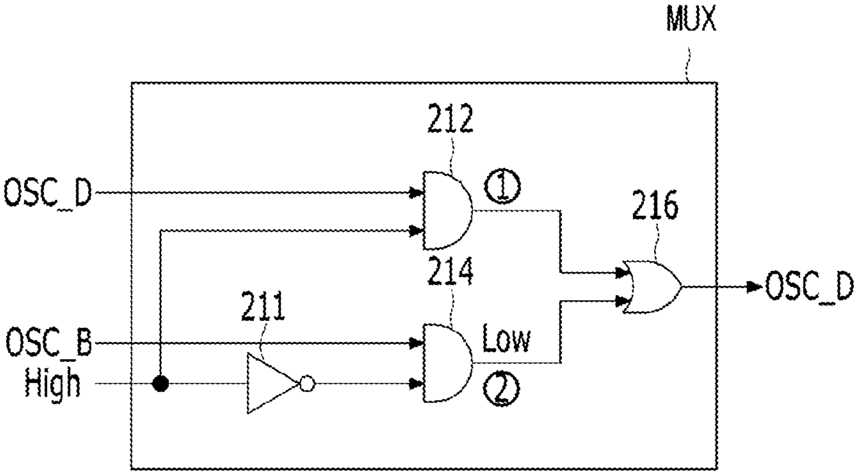
FIGS. 7 and 8 are views showing the construction of a multiplexer of FIG. 2 and an input and output signal relationship according to an embodiment of the present disclosure.
Figure 8:
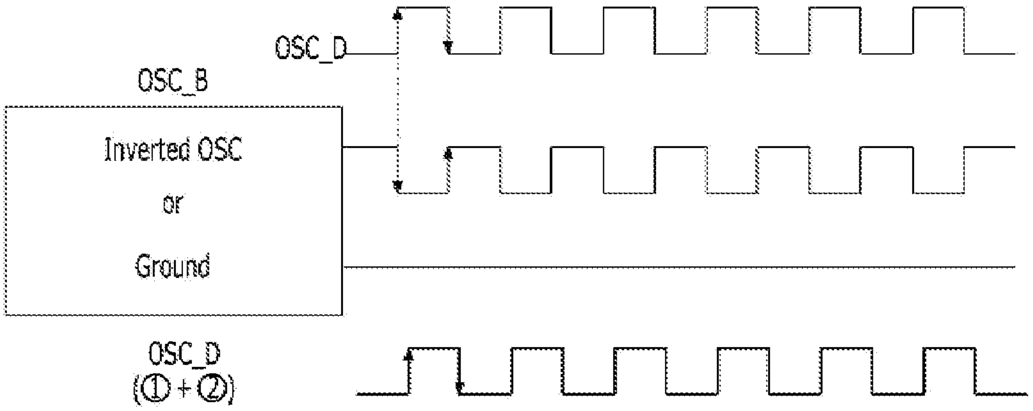

FIGS. 7 and 8 are views showing the construction of one of the multiplexers of FIG. 2 and an input and output signal relationship according to one embodiment. The multiplexer MUX is a 2-to-1 multiplexer configured to receive two signals and to output only one signal selected according to a selection signal. In this embodiment, the multiplexer MUX receives the delay-compensated OSC signal OSC_D and the EMI reduction signal OSC_B and outputs the delay-compensated OSC signal OSC_D to the flip-flop FF according to the selection signal.

Referring to FIGS. 7 and 8, the multiplexer MUX may include a first AND circuit 212, a second AND circuit 214, an OR circuit 216, and an inverter 211. When this embodiment is driven, a high signal may be input as a selection signal for selecting the output of the multiplexer MUX.

The inverter 211 is connected to an input end of the second AND circuit 214 to invert a selection signal to be input to the second AND circuit 214 and to input the inverted signal to the second AND circuit 214. Since a high signal is input as the selection signal when this embodiment is driven, a low signal is input to the second AND circuit 214 as a selection signal.

The first AND circuit 212 receives the delay-compensated OSC signal OSC_D and the high signal, which is the selection signal, and outputs the AND operation result of the two signals as an output signal ①. AND operation is an operation that outputs the conjunction of two input signals. When two input signals are high state, therefore, a high signal is output. Since the same signal as the high/low state of the delay-compensated OSC signal OSC_D is output as the output signal ① of the first AND circuit 212, therefore, the same signal as the delay-compensated OSC signal OSC_D is output.

The second AND circuit 214 receives the EMI reduction signal OSC_B and the low signal, which is the selection signal, and outputs the AND operation result of the two signals as an output signal ② Since the low signal, which is the selection signal, is always input to the second AND circuit 214, the low signal is always output as the output signal ② of the second AND circuit 214.

The OR circuit 126 receives the output signal ① of the first AND circuit 212 and the output signal ② of the second AND circuit 214 and outputs the OR operation result of the two signals. OR operation is an operation that outputs the disjunction of two inputs. When two inputs are low, therefore, a low signal is output. Since, in the inputs of the OR circuit 126, the output signal ① of the first AND circuit 212 is the same signal as the delay-compensated OSC signal OSC_D and the output signal ② of the second AND circuit 214 is always low, the same signal as the high/low state of the delay-compensated OSC signal OSC_D is output as the output signal of the OR circuit 126, and therefore the same signal as the delay-compensated OSC signal OSC_D is output.

In the above construction, the OSC signal may be applied to the flip-flops FF of the driving clock generator 200 together with the EMI reduction signal to reduce EMI of the OSC signal, and only the OSC signal, which is one of the two signals, may be input to each of the flip-flops FF in a clock tree structure.

In the above construction, the display device according to the embodiment of the present disclosure may be configured such that an EMI reduction signal line is formed in response to an OSC signal line that provides a reference signal of the operation clock and an inverted signal or a ground signal capable of reducing EMI generated in the OSC signal line is selectively supplied to the EMI reduction signal line, whereby the effect of EMI due to the OSC signal is reduced. Here, the OSC signal line and the EMI reduction signal line may be modified in order to further improve the EMI reduction effect.

Figure 9:
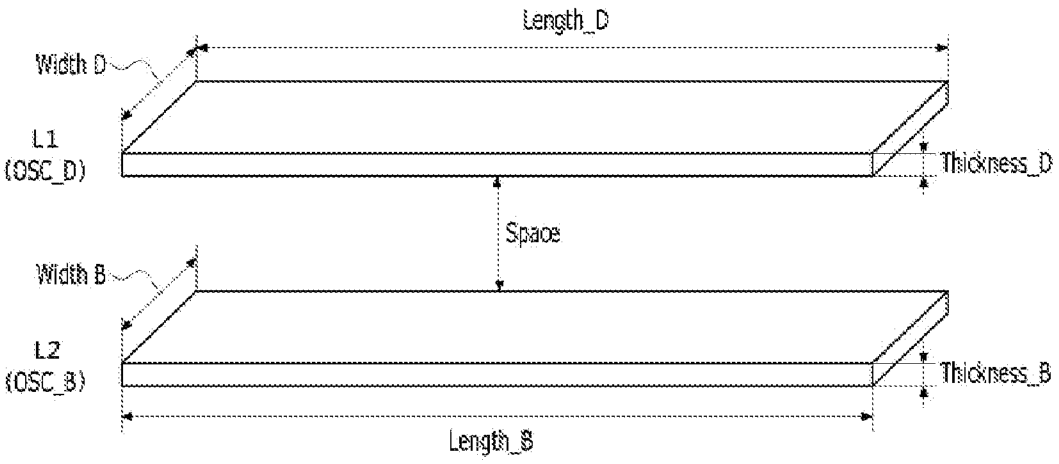
FIG. 9 is a view illustrating an EMI offset principle using a disposition method of an OSC signal line and an EMI reduction signal line according to an embodiment of the present disclosure.

FIG. 9 is a view illustrating an EMI offset principle using a disposition method of the OSC signal line and the EMI reduction signal line according to one embodiment.

When a first line L1, to which the OSC signal OSC_D is applied, and a second line, to which the EMI reduction signal OSC_B is applied, are disposed adjacent to each other, EMI may be reduced by the coupling effect between the two lines L1 and L2. The coupling effect means an effect in which high-frequency signals leak from two conductors by parasitic capacitance formed between the two conductors. That is, EMI may be reduced as the parasitic capacitance formed between the two conductors increases.

The parasitic capacitance C formed between the two conductors may be defined as represented by Expression 1 below.

$$C = \frac{\varepsilon A}{d} \quad \text{[Expression 1]}$$

A: area of each metal plate, d: distance between metal plates, and ε: dielectric permittivity between metals Referring to Expression 1, the parasitic capacitance C is proportional to the area A and the permittivity c of each of the conductors and is inversely proportional to the distance d between the conductors. Consequently, the EMI reduction effect is improved as the area A of each of the first line L1 and the second line L2 is increased, and the EMI reduction effect is improved as the distance d between the two lines L1 and L2 is decreased. Here, it is preferable for the first line L1 and the second line L2 to exhibit the same electrical signal characteristics and to have low electrical resistance. The optimized design values of the first line L1 and the second line L2 may be implemented based on design rules provided in a semiconductor production process in consideration of the above matters.

As shown in FIG. 9, the first line L1, to which the OSC signal OSC_D is applied, has a length Length_D, a width Width D, and a thickness Thickness_D, a second line L2, to which the EMI reduction signal OSC_B is applied, has a length Length_B, a width Width B, and a thickness Thickness_B, and there is a space Space between the first line L1 and second line L2. An area of the first line L1 is a product of the length Length_D and a width Width D, an area of the second line L2 is a product of the length Length_B and a width Width B, and a distance between the first line L1 and the second line L2 is space Space. The EMI reduction effect is improved as the area of each of the first line L1 and the second line L2 is increased, and the EMI reduction effect is improved as the distance between the two lines L1 and L2 is decreased.

FIGS. 10A, 10B, 10C, 11A, 11B, 11C, 12, 13A, 13B, and 13C are views illustrating a design method of a first line L1 and a second line L2 according to a first embodiment.

The first line L1 and the second line L2 adjacent to each other may be formed in a serrated structure having protrusions alternately formed on adjacent lines in order to maximize the EMI reduction effect due to the coupling effect while having the same electrical resistance characteristic values. When the protrusions are formed on the adjacent lines, the area of each of the lines is increased, whereby the parasitic capacitance may be increased. Here, when the protrusions of the adjacent lines are arranged side by side, the coupling effect may be improved due to reduction in distance between the lines, but electrical stability, such as ESD, may be lowered. When the protrusions of the adjacent lines are alternately arranged, the EMI offset and shielding effect may be improved due to the coupling effect in a diagonal direction while the distance between the two conductors is uniformly maintained.

Figure 10B:
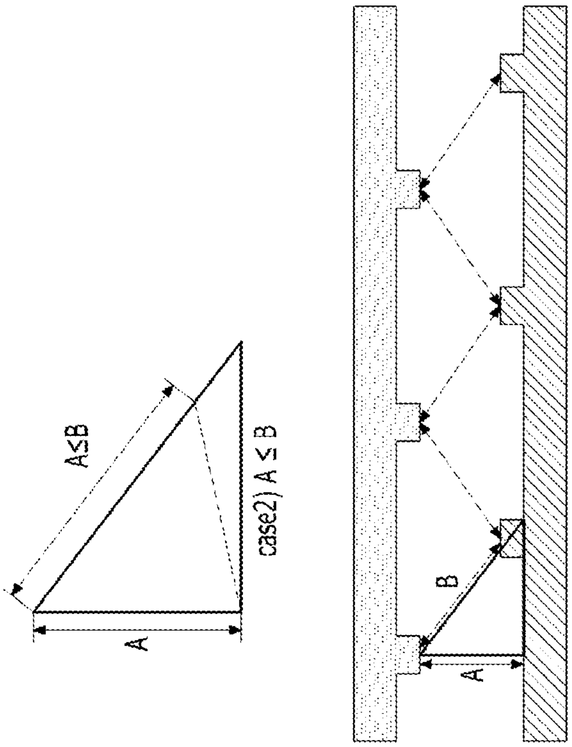
FIGS. 10A, 10B, 11A, 11B, 11C, 12, 13A, 13B, and 13C are views illustrating a design method of a first line L1 and a second line L2 according to a first embodiment.
Figure 10A:
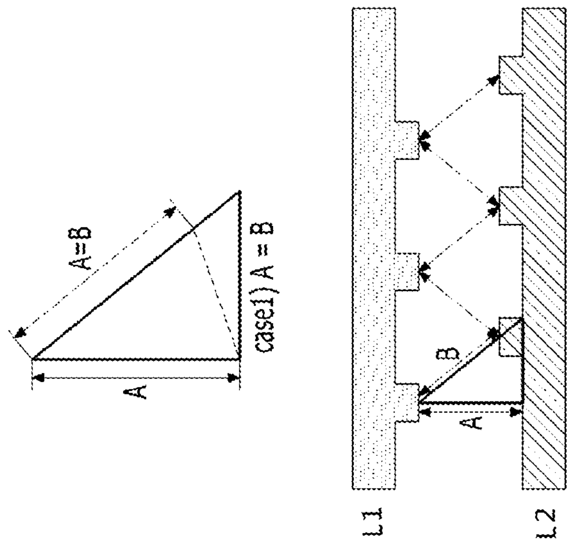

FIGS. 10A to 10B illustrate the case in which quadrangular protrusions are alternately formed in opposite areas of the first line L1 and the second line L2 according to one embodiment.

Referring to FIG. 10A, design may be made such that the vertical distance A between the end of one protrusion formed on the first line L1 and the second line L2 and the distance B between the end of one protrusion formed on the first line L1 and the end of a corresponding protrusion formed on the second line L2 are equal to each other (A=B). Here, the distance B between the end of one protrusion formed on the first line L1 and the end of a corresponding protrusion formed on the second line L2 may be defined as the distance between the center points of the ends of the protrusions.

Referring to FIG. 10B, the distance B between the end of one protrusion formed on the first line L1 and the end of a corresponding protrusion formed on the second line L2 may be designed to be equal to or greater than the vertical distance A between the end of one protrusion formed on the first line L1 and the second line L2(A≤B). When the opposite protrusions are alternately arranged according to the design requirements, it is possible to improve the EMI offset and shielding effect due to the coupling effect in the diagonal direction while uniformly maintaining the distance between the first line L1 and the second line L2.

FIGS. 11A, 11B, 11C, 12, 13A, 13B, and 13C illustrate various protrusion patterns designed such that the distance B between the end of one protrusion formed on the first line L1 and the end of a corresponding protrusion formed on the second line L2 is equal to or greater than the vertical distance A between the end of one protrusion formed on the first line L1 and the second line L2 (A≤B).

Figure 11A:
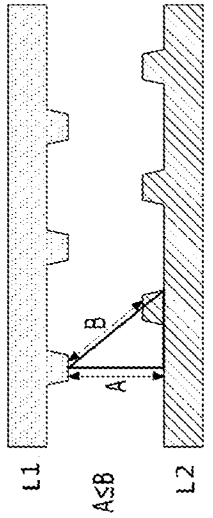
Figure 11B:
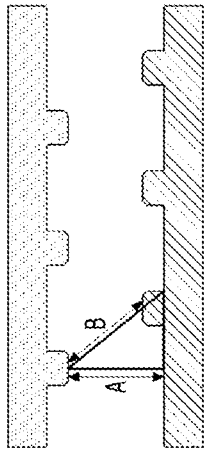
Figure 11C:
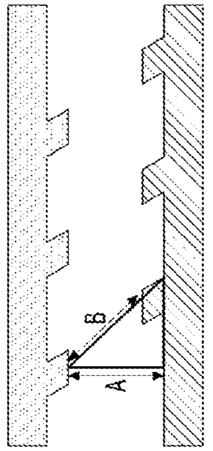

FIGS. 11A to 11C are views showing modifications of quadrangular protrusions alternately formed on adjacent lines.

FIG. 11A illustrates a tapered pattern in which the width of each quadrangular protrusion is gradually increased from the end of the quadrangular protrusion to a line having the quadrangular protrusion. FIG. 11B illustrates a pattern in which both ends of the quadrangular protrusion are rounded. FIG. 11C illustrates an inclined pattern in which each quadrangular protrusion formed on the first line L1 and a corresponding quadrangular protrusion formed on the second line L2 are inclined to face each other. The quadrangular protrusions formed on the first line L1 and the quadrangular protrusions formed on the second line L2 may be formed so as to be inclined in different directions.

Figure 12:
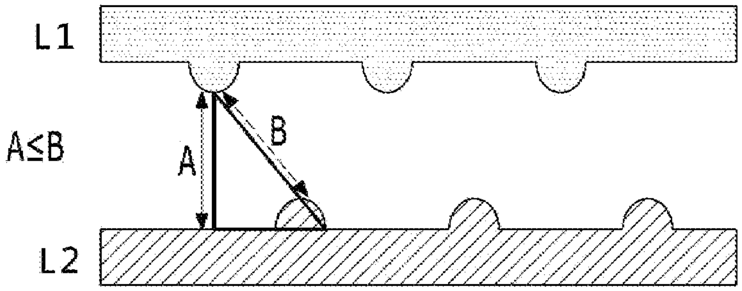

FIG. 12 is a view illustrating the structure in which semicircular protrusions are alternately formed on adjacent lines. As long as the design requirement in which the distance B between the end of one protrusion formed on the first line L1 and the end of a corresponding protrusion formed on the second line L2 is equal to or greater than the vertical distance A between the end of one protrusion formed on the first line L1 and the second line L2 (A≤B) is satisfied, the semicircular protrusions may be variously modified.

Figures 13A, 13B, 13C:
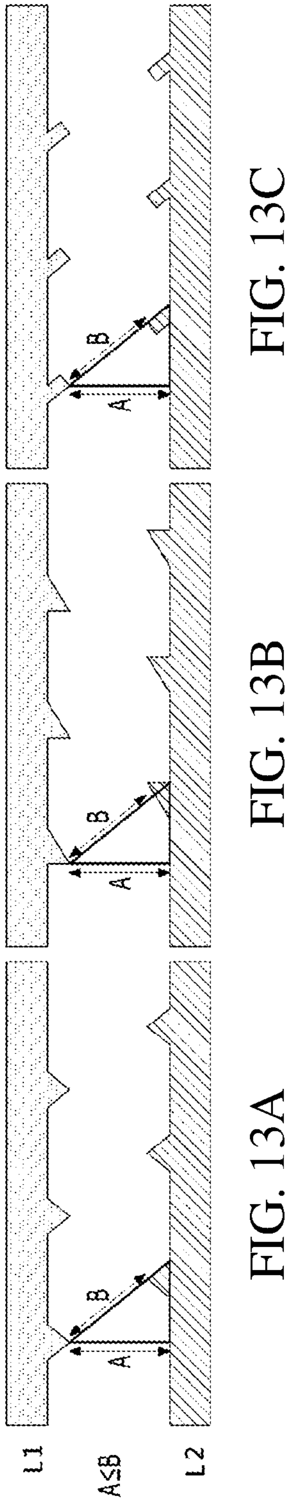

FIGS. 13A to 13C are views illustrating the structure in which triangular protrusions are alternately formed on adjacent lines. FIG. 13A illustrates an isosceles triangular pattern in which both sides of each triangular protrusion are identical. FIG. 13B illustrates a right triangular pattern. When protrusions each having a right triangular pattern are formed, the hypotenuse of each triangle formed on the first line L1 and the hypotenuse of a corresponding triangle formed on the second line L2 are inclined in different directions. FIG. 13C illustrates a bar-shaped pattern in which the end of each protrusion has triangular apex. Bar-shaped protrusions formed on the first line L1 and bar-shaped protrusions formed on the second line L2 may be formed so as to be inclined in different directions.

When the protrusions are alternately formed on the adjacent lines, such as the first line L1 and the second line L2, as described above, the area of each line may be increased, whereby it is possible to increase parasitic capacitance and to improve the EMI offset and shielding effect due to the coupling effect in the diagonal direction while maintaining the same distance.

Meanwhile, when the protrusions are formed on the lines, antenna characteristics in which electromagnetic waves generated from the lines have a specific radiation pattern are obtained. When an electrical signal is applied to a conductor, antenna characteristics in which electromagnetic waves are radiated and have a specific radiation pattern depending on the shape thereof are obtained.

Figure 14A:
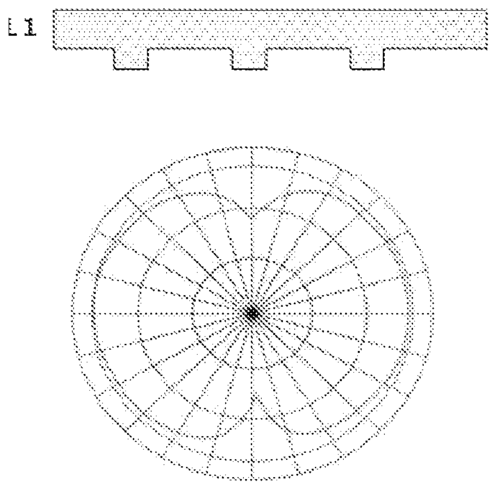
FIGS. 14A and 14B are views illustrating a radiation pattern depending on the shape of protrusions formed on a line according to an embodiment of the present disclosure.
Figure 14B:
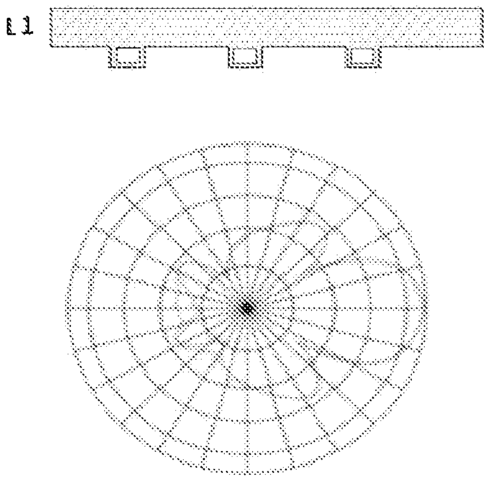

FIGS. 14A and 14B are views illustrating a radiation pattern depending on the shape of protrusions formed on a line.

As shown in FIG. 14A, when point circular protrusions are formed on the line, as in the first embodiment, it is possible to obtain isotropic characteristics in which uniform electromagnetic energy is radiated in all directions.

On the other hand, when loop protrusions are formed on the line, as shown in FIG. 14B, it is possible to obtain directivity characteristics in which electromagnetic energy is concentrated in a specific direction. Consequently, it is possible to improve the EMI offset effect using the antenna directivities of the two lines. That is, when loop protrusions are alternately formed on the first line L1 and the second line L2, the antenna directivities of the lines overlap each other, whereby it is possible to obtain the EMI offset effect. Here, when the loop protrusions are disposed such that the distance B between the end of one loop protrusion formed on the first line L1 and the end of a corresponding loop protrusion formed on the second line L2 is equal to or greater than the vertical distance A between the end of one loop protrusion formed on the first line L1 and the second line L2 (A≤B), it is possible to simultaneously obtain the coupling effect due to increase in area of the lines and to obtain the antenna directivity effect due to the loop shape of the protrusions, whereby it is possible to further improve the EMI offset effect.

FIGS. 15A, 15B, 15C, 16, 17A, 17B, and 17C are views illustrating a design method of a first line L1 and a second line L2 according to a second embodiment. Loop protrusions may be alternately arranged on the first line L1 and the second line L2 according to a second embodiment such that antenna directivities of the lines overlap each other, whereby it is possible to improve the EMI offset effect.

FIGS. 15A, 15B, 15C, 16, 17A, 17B, and 17C illustrate various loop protrusion patterns designed such that the distance B between the end of one loop protrusion formed on the first line L1 and the end of a corresponding loop protrusion formed on the second line L2 is equal to or greater than the vertical distance A between the end of one loop protrusion formed on the first line L1 and the second line L2 (A≤B).

Figure 15A:
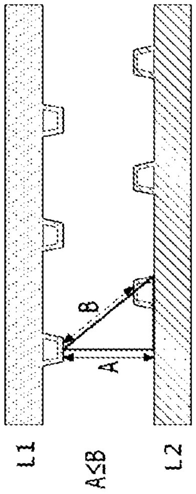
FIGS. 15A, 15B, 15C, 16, 17A, 17B, and 17C are views illustrating a design method of a first line L1 and a second line L2 according to a second embodiment.
Figure 15B:
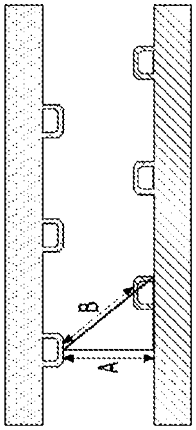
Figure 15C:
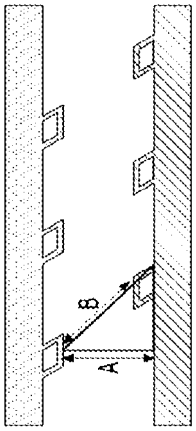

FIG. 15A illustrates a tapered pattern in which the width of each quadrangular loop protrusion is gradually increased from the end of the quadrangular loop protrusion to a line having the quadrangular protrusion. FIG. 15B illustrates a loop protrusion pattern in which both ends of the quadrangular loop protrusion are rounded. FIG. 15C illustrates an inclined pattern in which each quadrangular loop protrusion formed on the first line L1 and a corresponding quadrangular loop protrusion formed on the second line L2 are inclined to face each other. The quadrangular loop protrusions formed on the first line L1 and the quadrangular loop protrusions formed on the second line L2 may be formed so as to be inclined in different directions.

Figure 16:
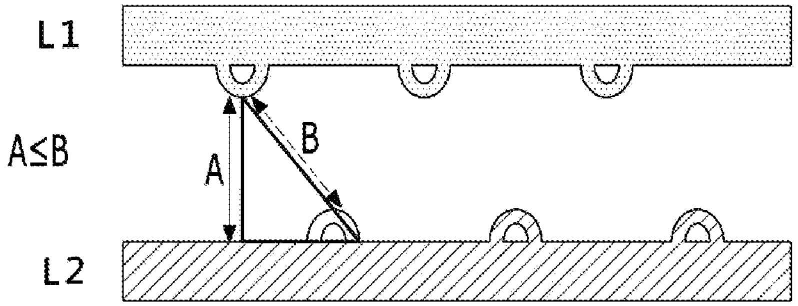

FIG. 16 is a view illustrating the structure in which semicircular loop protrusions are alternately formed on adjacent lines. As long as the design requirements in which the distance B between the end of one loop protrusion formed on the first line L1 and the end of a corresponding loop protrusion formed on the second line L2 is equal to or greater than the vertical distance A between the end of one loop protrusion formed on the first line L1 and the second line L2 (A≤B) are satisfied, the semicircular loop protrusions may be variously modified.

Figure 17C:
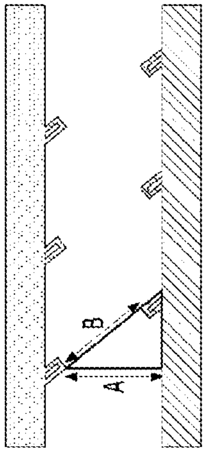
Figure 17B:
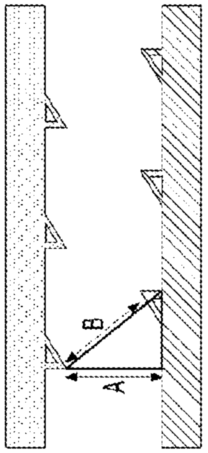
Figure 17A:
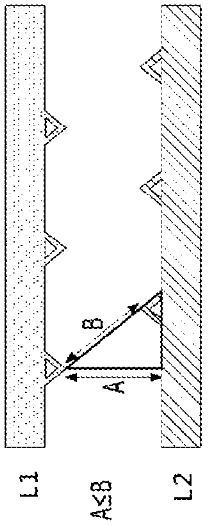

FIGS. 17A to 17C are views illustrating the structure in which triangular loop protrusions are alternately formed on adjacent lines. FIG. 17A illustrates an isosceles triangular pattern in which both sides of each triangular loop protrusion are identical. FIG. 17B illustrates a right triangular pattern. When loop protrusions each having a right triangular pattern are formed, the hypotenuse of each triangle formed on the first line L1 and the hypotenuse of a corresponding triangle formed on the second line L2 are inclined in different directions. FIG. 17C illustrates a bar-shaped pattern in which the end of each loop protrusion has a triangular apex. Bar-shaped loop protrusions formed on the first line L1 and bar-shaped loop protrusions formed on the second line L2 may be formed so as to be inclined in different directions.

When the loop protrusions are alternately formed on the adjacent lines, such as the first line L1 and the second line L2 according to the second embodiment, as described above, it is possible to obtain the coupling effect due to increase in area of the lines and to improve the EMI offset effect using the antenna directivity characteristics of the lines.

As is apparent from the above description, an embodiment of the present disclosure has the following effects.

The embodiment of the present disclosure has an effect in that an EMI reduction signal line is formed in response to an OSC signal line that provides a reference signal of an operation clock and an inverted signal or a ground signal capable of reducing EMI generated in the OSC signal line is selectively supplied to the EMI reduction signal line, whereby it is possible to reduce the effect of EMI due to the OSC signal.

The embodiment of the present disclosure has an effect in that the OSC signal line and the EMI reduction signal line are disposed parallel to each other and protrusions are alternately formed on the OSC signal line and the EMI reduction signal line, whereby it is possible to maximize the EMI reduction effect due to the coupling effect between the two lines.

Effects of the present disclosure are not limited to the above effects, and the present disclosure has a wider variety of effects.

Those skilled in the art will understand that various modification and alternations are possible from the above description without departing from the technical idea of the present disclosure.

What is claimed is:

1. A clock generator comprising:

an oscillator configured to output a reference clock signal to a first line;

an electromagnetic interference (EMI) reduction controller configured to generate an EMI reduction signal offset with the reference clock signal and to output the EMI reduction signal to a second line; and a driving clock generator configured to generate an operation clock signal based on the reference clock signal, which is one of the reference clock signal input through the first line and the EMI reduction signal input through the second line, wherein the EMI reduction signal comprises an inverted oscillation clock signal (OSC) signal that offsets EMI by the reference clock signal and a ground signal for shielding the reference clock signal.

2. A clock generator comprising:

an oscillator configured to output a reference clock signal to a first line;

an electromagnetic interference (EMI) reduction controller configured to generate an EMI reduction signal offset with the reference clock signal and to output the EMI reduction signal to a second line; and a driving clock generator configured to generate an operation clock signal based on the reference clock signal, which is one of the reference clock signal input through the first line and the EMI reduction signal input through the second line, wherein the first line and the second line each has a serrated structure, the serrated structure of the first line and the serrated structure of the second line being facing and staggered with each other.

3. The clock generator according to claim 1, further comprising:

a delay compensator configured to synchronize phases of the reference clock signal and the EMI reduction signal.

4. The clock generator according to claim 1, wherein the driving clock generator comprises:

a plurality of multiplexers connected to the first line and the second line in a tree structure, the plurality of multiplexers configured to output the reference clock signal applied to the first line; and a plurality of flip-flops respectively connected to the plurality of multiplexers, the plurality of flip-flops configured to generate a driving clock signal based on the reference clock signal.

5. The clock generator according to claim 1, wherein the EMI reduction controller comprises:

an inverter configured to generate the inverted OSC signal by inverting the reference clock signal; and an output circuit configured to output a selected one of the inverted OSC signal and the ground signal.

6. The clock generator according to claim 1, wherein the first line and the second line have a uniform distance therebetween.

7. The clock generator according to claim 1, wherein the first line comprises a plurality of first protrusions protruding to an area adjacent to the second line, the second line comprises a plurality of second protrusions protruding to an area adjacent to the first line, the plurality of second protrusions having a same shape as the plurality of first protrusions, and the plurality of first protrusions and the plurality of second protrusions are alternately arranged.

8. The clock generator according to claim 7, wherein the plurality of first protrusions and the plurality of second protrusions are arranged such that a distance between an end of each of the plurality of first protrusions and an end of a corresponding one of the plurality of second protrusions is equal to or greater than a vertical distance between an end of a first protrusion from the plurality of first protrusions and the second line.

9. The clock generator according to claim 8, wherein the distance between the end of each first protrusion and the end of the corresponding one of the second protrusions is a distance between a center point of the end of each first protrusion and a center point the end of the corresponding one of the second protrusions.

10. The clock generator according to claim 7, wherein each of the plurality of first protrusions and the plurality of second protrusions has a loop shape.

11. A display device comprising:

a display panel comprising a plurality of pixels connected to a data line and a gate line;

a gate driver integrated circuit (IC) configured to supply a gate signal to the gate line; and a plurality of timing controller merged integrated circuits (TMICs) configured to covert an image signal input from an outside and supply image data to the display panel, wherein each of the plurality of TMICs comprises:

an oscillator configured to output a reference clock signal to a first line;

an electromagnetic interference (EMI) reduction controller configured to generate an EMI reduction signal offset with the reference clock signal and to output the EMI reduction signal to a second line; and a driving clock generator configured to generate an operation clock signal for supplying the image data to the display panel based on the reference clock signal, which is one of the reference clock signal input through the first line and the EMI reduction signal input through the second line, wherein the EMI reduction signal comprises an inverted oscillation clock signal (OSC) signal that offsets EMI by the reference clock signal and a ground signal for shielding the reference clock signal.

12. The display device according to claim 11, wherein each of the plurality of TMICs further comprises a cascade synchronization controller configured to synchronize the operation clock signal.

13. The display device according to claim 12, wherein one of the TMICs is set as a master TMIC, and others of the TMICs is set as slave TMICs, and wherein cascade synchronization controllers are configured to synchronize operation clock signals of the slave TMICs and an operation clock signal of the master TMIC.

14. The display device according to claim 12, wherein one of the plurality of TMICs is set as a master TMIC, and the master TMIC generates a control signal that controls the gate driver IC based on the reference clock signal and applies the control signal to the gate driver IC.

15. The display device according to claim 11, each of the plurality of TMICs further comprises a delay compensator configured to synchronize phases of the reference clock signal and the EMI reduction signal.

16. The display device according to claim 11, wherein the first line and the second line have a uniform distance therebetween, wherein the first line comprises a plurality of first protrusions protruding to an area adjacent to the second line, the second line comprises a plurality of second protrusions protruding to an area adjacent to the first line, the plurality of second protrusions having a same shape as the plurality of first protrusions, and the plurality of first protrusions and the plurality of second protrusions are alternately arranged.

17. The display device according to claim 16, wherein the plurality of first protrusions and the plurality of second protrusions are arranged such that a distance between an end of each of the plurality of first protrusions and an end of a corresponding one of the plurality of second protrusions is equal to or greater than a vertical distance between an end of a first protrusion from the plurality of first protrusions and the second line.

18. The display device according to claim 16, wherein each of the plurality of first protrusions and the plurality of second protrusions has a loop shape.

* * * * *